No. 821,863. PATENTED MAY 29, 1906.
F. P. DERR.
SINGLE TRACK RAILWAY.
APPLICATION FILED JAN. 27, 1906.
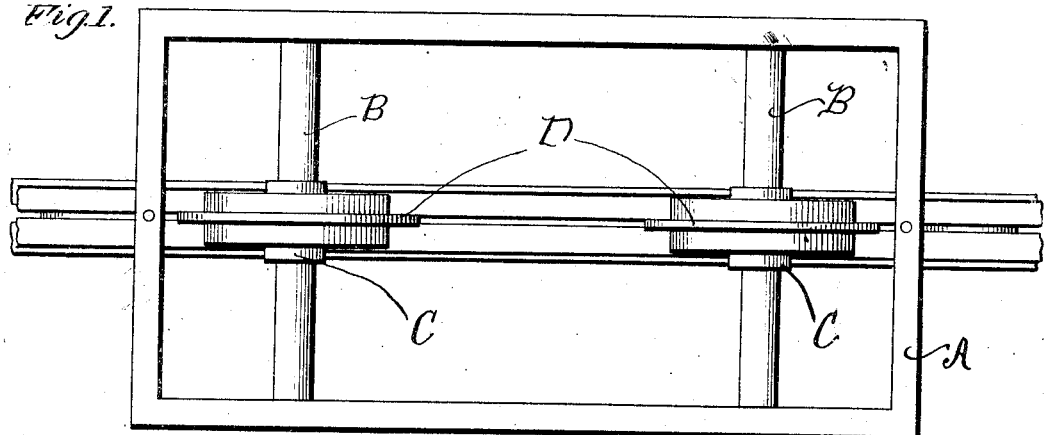
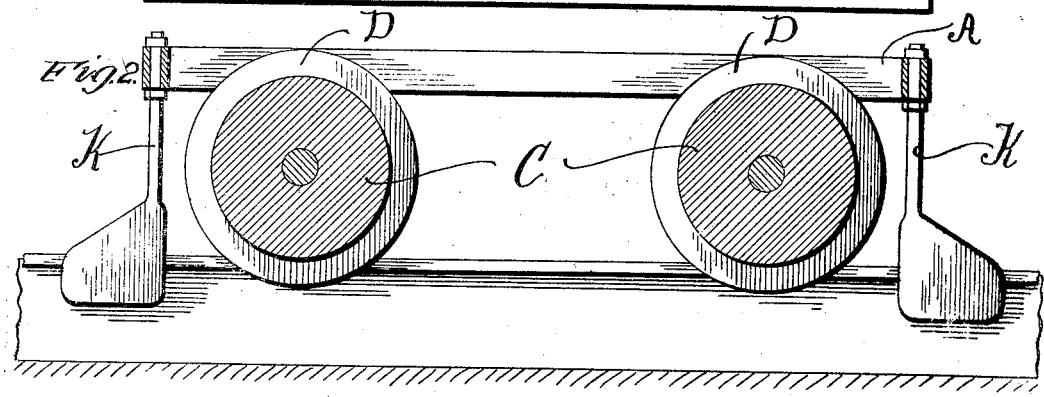
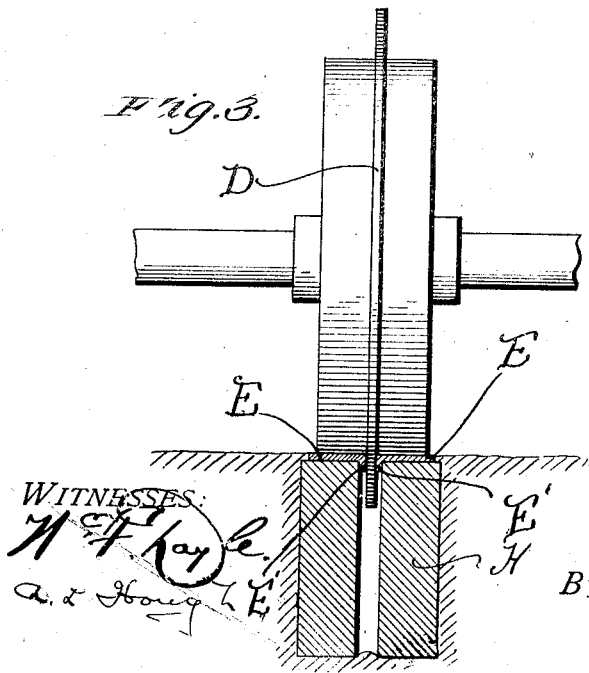
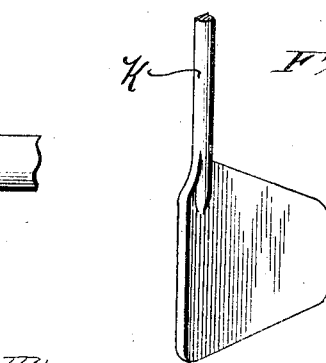
WITNESSES:
INVENTOR
Frank P. Derr,
BY Franklin H. Hough
Attorney

UNITED STATES PATENT OFFICE.

FRANK P. DERR, OF BALTIMORE, MARYLAND.

SINGLE-TRACK RAILWAY.

No. 821,863.     Specification of Letters Patent.     Patented May 29, 1906.

Application filed January 27, 1906. Serial No. 298,258.

*To all whom it may concern:*

Be it known that I, FRANK P. DERR, a citizen of the United States, residing at Baltimore, in the State of Maryland, have invented certain new and useful Improvements in Single-Track Railways; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in trucks for railway-cars; and the object of the invention is to produce a simple and efficient device of this nature in which a series of tandem wheels positioned, preferably, underneath the center of the car is employed in place of the usual wheels which are arranged in pairs and requiring two tracks.

My invention consists, more specifically, in the provision of a truck having a plurality of axles journaled therein and provided each with a wheel having a central flange about its tread and adapted to engage a slot intermediate the rails and in the provision of means carried by the truck for keeping the slot clear of obstructions.

My invention consists, further, in other details of construction and arrangements of parts, which will be hereinafter fully described and then specifically defined in the appended claim.

I illustrate my invention in the accompanying drawings, in which—

Figure 1 is a top plan view of my improved truck. Fig. 2 is a sectional view centrally through the truck. Fig. 3 is an edge elevation of one of the wheels, shown as resting upon the track with the flange of the rail engaging a slot intermediate the rails; and Fig. 4 is a detail perspective view of the attachment for clearing the slot of obstructions.

Reference now being had to the details of the drawings by letter, A designates a truck, which may be of any suitable construction and so arranged that it may have a swinging motion to allow the truck to pass about curves of tracks without unnecessary friction, and journaled in said truck are the axles B B. Fixed to each axle is a wheel C, having a tread-surface which is divided centrally by an integral flange D, projecting from the circumference of the wheel, said flange being preferably of a width equal to the tread-surface upon either side of the flange.

E E designate the rails, which have their inner ends angled, as at E', and are fastened to the girders or beams H, with their inner angled ends overhanging the inner walls of said beams and spaced apart a sufficient distance to receive the flange D and allow the same to turn therein without much friction. Swiveled to each end of the truck are the pilots K, the lower ends of which are winged and are adapted to travel in the slots in advance of the wheels for the purpose of clearing any obstructions which might enter the space between the beams and the angled portions of said rails.

It will be noted from the foregoing that by the provision of the pilots, which have a swiveled movement allowing the same to turn about curves, all obstructions will be kept out of the way of the wheels, which will have wide bearing-surfaces upon the rails, and by reason of the flange extending between the rails the wheels will be held to the rails.

It will also be noted that by the provision of the apparatus shown and described a considerable amount of friction is dispensed with by reducing the contact-surface of the wheels one-half over the ordinary trucks requiring wheels arranged in pairs upon the ends of the axles.

What I claim is—

In combination with the truck of a car having axles mounted thereon, wheels rotating with said axles and provided each with a central flange, tracks having their inner ends angled and extending into a slot of a conduit and adapted to hold said flange vertically in the slot of the conduit, pilots having shank portions journaled in the end of the truck and having winged ends adapted to travel in said slot, the upper edge of the winged portion being inclined backward and upward from the level of the track, as shown and described.

In testimony whereof I hereunto affix my signature in the presence of two witnesses.

FRANK P. DERR.

Witnesses:
MICHAEL A. MUELLER
JOSEPH HOUSE.